(12) United States Patent
Kuwabara et al.

(10) Patent No.: US 8,525,405 B2
(45) Date of Patent: Sep. 3, 2013

(54) ELECTRONIC DEVICES WITH FLEXIBLE GLASS POLARIZERS

(75) Inventors: Masato Kuwabara, Tsukuba (JP);
Cheng Chen, San Jose, CA (US);
Benjamin M. Rappoport, Los Gatos, CA (US); Roland Lue, San Francisco, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/415,780

(22) Filed: Mar. 8, 2012

(65) Prior Publication Data

US 2013/0044282 A1    Feb. 21, 2013

Related U.S. Application Data

(60) Provisional application No. 61/525,535, filed on Aug. 19, 2011.

(51) Int. Cl.
*H01J 1/62* (2006.01)

(52) U.S. Cl.
USPC .......................................... 313/506; 313/498

(58) Field of Classification Search
USPC ...................... 313/498, 506, 512; 349/12, 16
See application file for complete search history.

(56) References Cited

U.S. PATENT DOCUMENTS

| | | | |
|---|---|---|---|
| 2,237,567 A | 4/1941 | Land | |
| 4,674,840 A | 6/1987 | Bennett | |
| 4,748,366 A * | 5/1988 | Taylor | 310/328 |
| 6,355,125 B1 | 3/2002 | Tahon et al. | |
| 6,888,592 B2 | 5/2005 | Kitagawa et al. | |
| 7,505,101 B2 | 3/2009 | Ichihashi et al. | |
| 7,965,370 B2 | 6/2011 | Matsumori et al. | |
| 2005/0134749 A1* | 6/2005 | Abileah | 349/16 |
| 2006/0234035 A1 | 10/2006 | Wang et al. | |
| 2008/0233312 A1 | 9/2008 | Nakamura et al. | |
| 2009/0251644 A1 | 10/2009 | Park et al. | |

FOREIGN PATENT DOCUMENTS

| | | |
|---|---|---|
| EP | 0716339 | 6/1996 |
| EP | 1865347 | 12/2007 |
| EP | 2372409 | 10/2011 |
| JP | 55140816 | 11/1980 |
| JP | 10-39138 | 2/1998 |
| WO | 2010143503 | 12/2010 |

* cited by examiner

*Primary Examiner* — Vip Patel
(74) *Attorney, Agent, or Firm* — Treyz Law Group; G. Victor Treyz; Louis R. Levenson

(57) ABSTRACT

Electronic devices may be provided with displays having polarizer structures. Polarizer structures may incorporate flexible layers of glass. The flexible glass layers may be laminated to other sheets of material in the polarizer structures using roll-to-roll lamination equipment. After the polarizer structures are cut into panels, the panels may be laminated to liquid crystal display structures, organic light-emitting-diode display structures or other display structures using sheet-to-sheet lamination tools. Ultraviolet-light-blocking material may be incorporated into a display to prevent damage to the polarizer layers in the polarizer structures. Coatings such as antireflection coatings, antistatic coating, and anti-smudge coatings may be provided on the polarizer structures. Displays may use the flexible glass layers and additional protective layers to prevent a polarizer layer from being exposed to excessive moisture. A birefringent layer may be incorporated into a display and may serve as a protective layer for a polarizer.

20 Claims, 17 Drawing Sheets

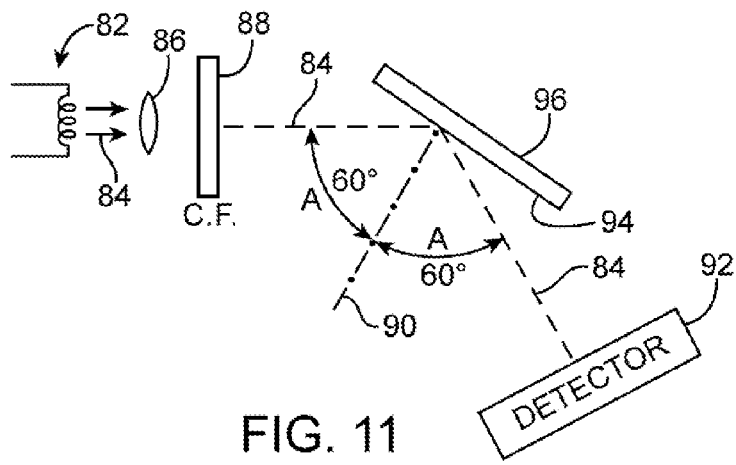
FIG. 11
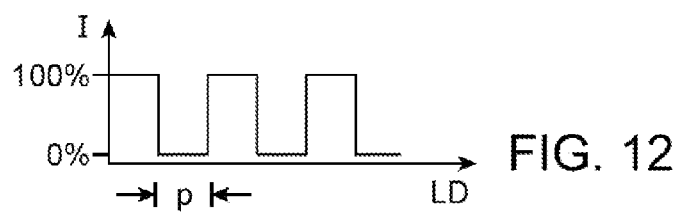
FIG. 12
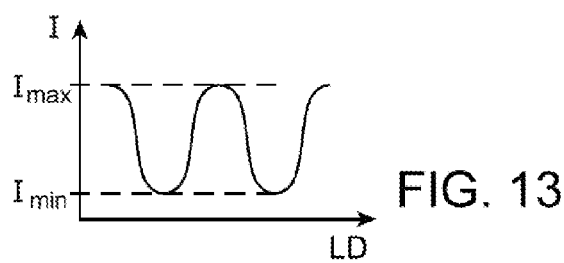
FIG. 13
REFLECTION IMAGE CLARITY $C = C_{0.125} + C_{.25} = C_{0.5} + C_1$
i.e., $C = \sum \frac{I_{max} - I_{min}}{100 - 0} \cdot 100\%$
FIG. 14

ELECTRONIC DEVICES WITH FLEXIBLE GLASS POLARIZERS

This application claims the benefit of provisional patent application No. 61/525,535, filed Aug. 19, 2011, which is hereby incorporated by reference herein in its entirety.

BACKGROUND

This relates generally to optical polarizers and, more particularly, to polarizers in the displays of electronic devices.

Electronic devices often have displays such as liquid crystal displays and organic light-emitting-diode displays. Displays such as these often use polarizers. For example, a liquid crystal display may have upper and lower polarizers. Pixels in a liquid crystal display may be controlled to locally adjust the polarization of liquid crystal material interposed between the upper and lower polarizers, thereby creating images on the liquid crystal display. Organic light-emitting-diode displays have pixels that emit light. Circular polarizers can be included in displays such as organic light-emitting-diode displays to help reduce unwanted reflections from metal electrode lines within the display.

Linear polarizers are often formed from stretched polyvinyl alcohol (PVA) films doped with iodine. The stretched films contain iodine molecules that are aligned along the stretch axis of the PVA film. Light having its electric field oriented along the stretch axis tends to be absorbed by the PVA film, whereas light having its electric field perpendicular to the stretch axis is typically transmitted through the film. This non-uniform behavior causes light that is passing through the PVA film to become linearly polarized.

Polarizer films such as PVA films can be fragile and sensitive to moisture. To prevent damage to the PVA film in a linear polarizer, the upper and lower surfaces of the PVA film are typically covered with opposing upper and lower layers of tri-acetyl cellulose (TAC) material. In many devices, a rigid display cover glass layer is mounted over a polarizer to prevent damage to the TAC and PVA layers.

The inclusion of the rigid display cover glass can add undesirable weight to an electronic device. The cover glass can be omitted to reduce the size and weight of a device, but omitting the cover glass can make the polarizer and the display susceptible to damage from scratches.

Polarizers formed from PVA and TAC films can also sometimes exhibit undesirable surface roughness, leading to visual artifacts on a display.

It would therefore be desirable to be able to provide improved polarizers and displays for electronic devices.

SUMMARY

Electronic devices may be provided with displays having polarizer layers. Polarizer structures in a display may be formed using a flexible layer of glass. The flexible glass layer may be sufficiently thin to allow the flexible glass layer to be dispensed from a roll of glass during manufacturing. The flexible glass layer may, for example, be dispensed from a roll of glass and laminated to other sheets of material to form polarizer structures using roll-to-roll lamination equipment.

Polarizer structures that have been formed in this way may be divided into panels using cutting equipment such as laser cutting equipment. After the polarizer structures have been cut into panels, the panels may be laminated to liquid crystal display structures, organic light-emitting-diode display structures, or other display structures using sheet-to-sheet lamination tools.

A polarizer structure for a display may include a flexible glass layer, a polarizer layer such as a layer of polyvinyl alcohol doped with iodine, and one or more additional layers such as tri-acetyl cellulose layers and birefringent layers.

Ultraviolet-light-blocking material may be incorporated into a display to prevent damage to the polarizer layer and other light sensitive layers. An ultraviolet-light-blocking material may, for example, be interposed between a flexible glass layer and a polyvinyl alcohol polarizer layer to prevent ultraviolet light damage to the polyvinyl alcohol polarizer layer.

Coatings such as antireflection coatings, antistatic coating, and anti-smudge coatings may be provided on the polarizer structures.

Further features of the invention, its nature and various advantages will be more apparent from the accompanying drawings and the following detailed description of the preferred embodiments.

BRIEF DESCRIPTION OF THE DRAWINGS

FIG. 11 is a schematic diagram of an illustrative system that may be used in evaluating reflection image clarity in accordance with an embodiment of the present invention.

FIG. 12 is a graph showing how the transmittance of a comb filter of the type used in the system of FIG. 11 may vary is a function of distance across the comb filter in accordance with an embodiment of the present invention.

FIG. 13 is a graph showing how intensity measurements in a system of the type shown in FIG. 11 may vary as a function of distance across a light detector in accordance with an embodiment of the present invention.

FIG. 14 shows expressions that may be used in evaluating the smoothness of a display with a polarizer having a flexible glass layer in accordance with an embodiment of the present invention.

DETAILED DESCRIPTION

Figure 1:
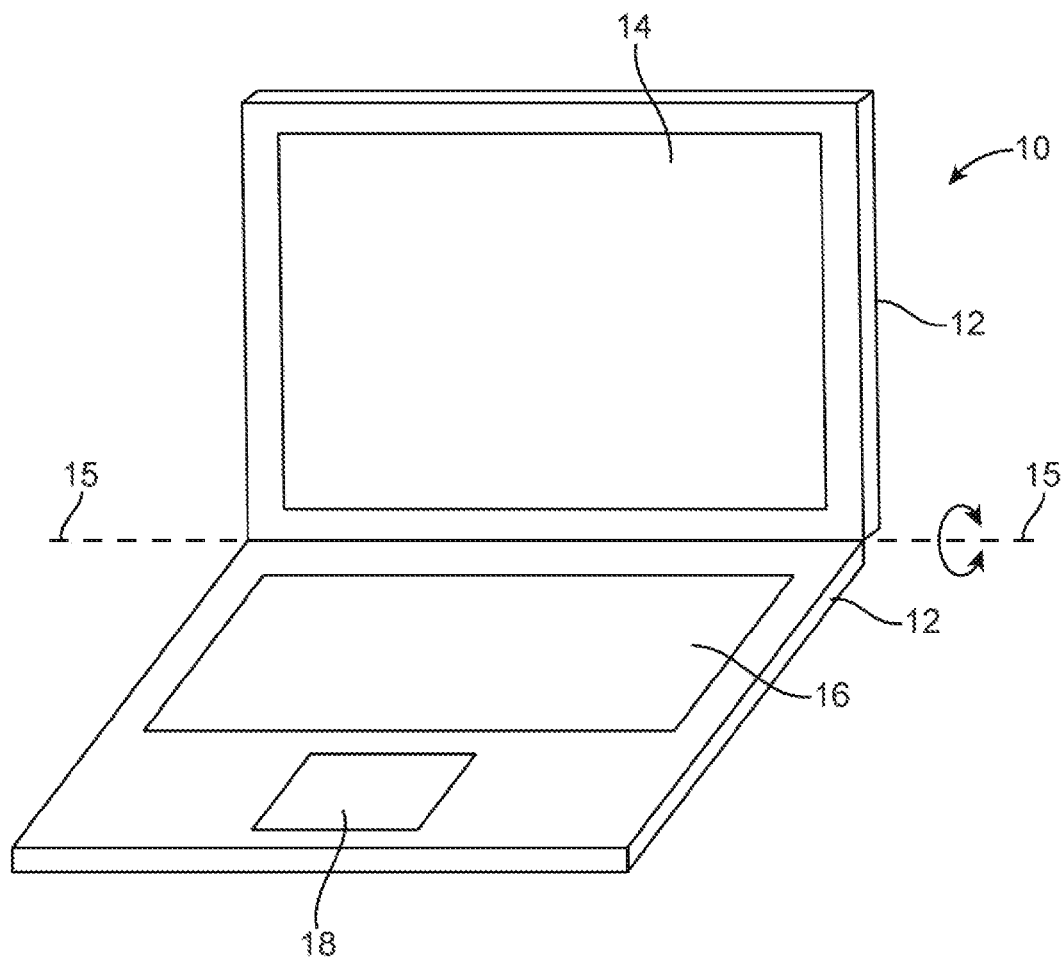
FIG. 1 is a perspective view of an illustrative electronic device of the type that may be provided with a polarizer with a flexible glass layer in accordance with an embodiment of the present invention.

Electronic devices such as device 10 of FIG. 1 may be provided with displays such as display 14. Electronic device 10 of FIG. 1 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of materials such as these.

Display 14 may be a plasma display, an electronic ink display, or other suitable display. Illustrative configurations in which electronic devices have been provided with displays such as liquid crystal displays and organic light-emitting-diode displays are sometimes described herein as examples. This is, however, merely illustrative. Electronic devices such as device 10 of FIG. 1 may be formed using any suitable type of display technology. The displays that are formed in electronic devices such as device 10 of FIG. 1 may be touch insensitive or may incorporate touch sensors such as capacitive touch sensor arrays or other touch sensor arrays formed using other touch technologies (e.g., resistive touch, acoustic touch, piezo-electric touch or other pressure-sensitive touch, etc.).

Device 10 may have input-output components such as keyboard 16, track pad 18, and other input-output devices such as buttons, input-output ports, microphones, sensors, speakers, data ports, etc. In the illustrative configuration of FIG. 1, device 10 has been provided with a hinge to allow the upper portion of housing 12 that contains display 14 to be rotated around hinge axis 15 with respect to the lower portion of housing 12. Configurations for device 10 without hinges may also be used.

Figure 2:
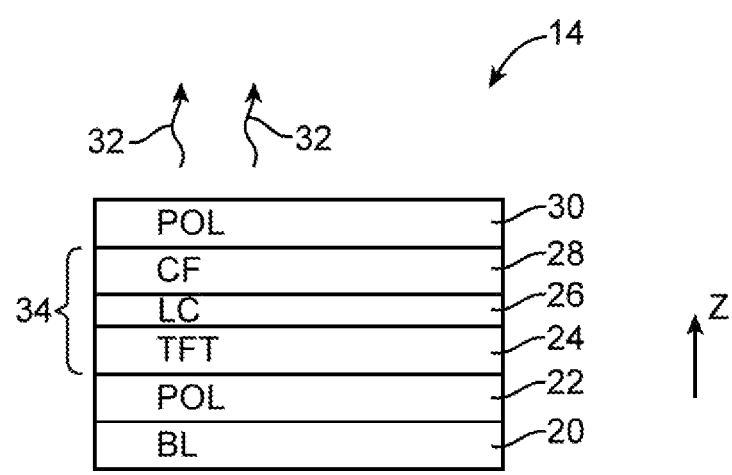
FIG. 2 is a cross-sectional side view of an illustrative liquid crystal display of the type that may be provided with a polarizer in accordance with an embodiment of the present invention.

FIG. 2 is a cross-sectional side view of an illustrative configuration that may be used for display 14 of FIG. 1. In the example of FIG. 2, display 14 has been based on a liquid crystal display structure. As shown in FIG. 2, display 14 may be provided with a backlight unit such as backlight unit 20 that produces light 32 that travels thought the layers of display 14 upwards in vertical direction Z.

Liquid crystal display structures 34 may include thin-film transistor layer 24, liquid crystal layer 26, and color filter layer 28. Thin-film transistor layer 24 may contain an array of pixels each of which can be individually controlled to change the electric field that is passing through an associated pixel of liquid crystal material 26. Color filter layer 28 may contain a colored array of filter elements that impart color to the image being produced by thin-film transistor layer 24 and liquid crystal layer 26. Thin-film transistor layer 24 and/or color filter element layer 28 may be formed from glass substrates, from polymer substrates, from ceramic substrates, or from other suitable substrates. In configurations in which display 14 includes touch technology, one or more layers of capacitive touch sensors or other sensors may be incorporated among the layers of display 14. For example, patterned indium tin oxide capacitor electrodes may be formed on a substrate such as color filter layer substrate 28 or on another layer that is incorporated into structures 34.

Upper polarizer 30 and lower polarizer 22 may be linear polarizers. The liquid crystal material 26 that is interposed between thin-film transistor layer 24 and color filter layer 28 can control the local polarization of light passing through display structures 34 (formed from thin-film transistor layer 24, liquid crystal layer 26, and color filter layer 28). Due to the presence of upper polarizer 30 and lower polarizer 22, the local polarization changes that are made using display structures 34 can create images for viewing by a user of display 14.

If desired, displays such as display 14 of FIG. 2 may have other optical layers. For example, a retarder (sometimes referred to as a birefringent layer or compensation film) may be interposed between structures 34 and polarizer 30 or incorporated into the layers of polarizer 30 to help improve the angle of view of display 14.

Figure 3:
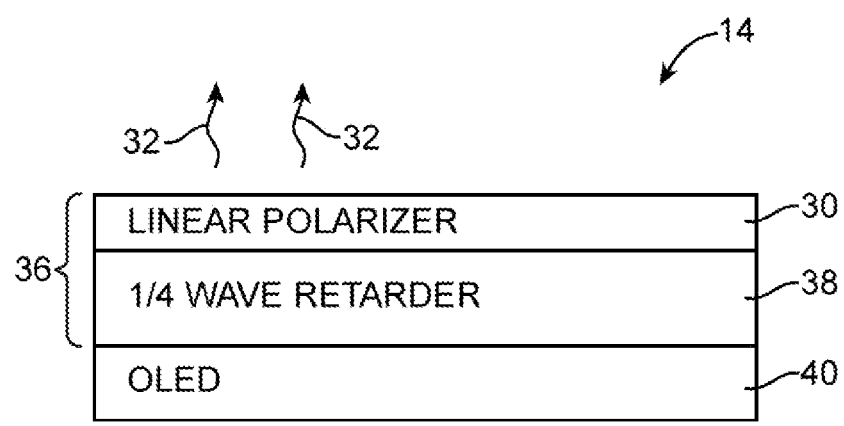
FIG. 3 is a cross-sectional side view of an organic light emitting diode display with a polarizer in accordance with an embodiment of the present invention.

FIG. 3 is a cross-sectional side view of an illustrative organic light-emitting-diode display. As shown in FIG. 3, display 14 may have an organic light-emitting-diode layer such as layer 40. Layer 40 may include light-emissive material that is locally turned on and off using an array of metal electrode lines. Emitted light 32 passes vertically upwards through circular polarizer 36. Circular polarizer 36 may be used to reduce unwanted reflections due to the reflective metal that makes up the electrode lines.

Circular polarizer 36 may include a quarter-wave retarder (quarter-wave plate) such as retarder 38 (i.e., a birefringent layer) and a linear polarizer such as linear polarizer 30.

Linear polarizers in displays such as display 14 may be formed from flexible glass layers. For example, polarizer 30 of FIG. 2, polarizer 30 of FIG. 3, and other polarizers is display 14 may be formed from a layer of glass that is sufficiently thin (e.g., less than about 0.2 mm) to permit bending of the layer of glass (e.g., to a bend radius of less than 1 m, less than 0.5 m or less than 0.1 m). The flexibility of the flexible glass layer may permit the glass layer to be assembled with other polarizer layers using roll-to-roll lamination equipment, thereby facilitating mass production.

A cross-sectional side view of a conventional polarizer of the type that is used in conventional displays is shown in FIG.

Figure 4:
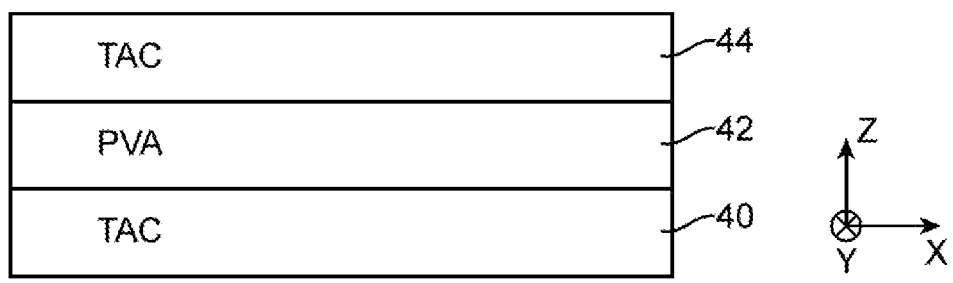
FIG. 4 is a cross-sectional side view of a conventional polarizer.

4. As shown in FIG. 4, the polarizer has a polarizer layer such as polyvinyl alcohol (PVA) layer 42. PVA layer 42 is typically doped with a dopant such as iodine and is stretched along one of its lateral dimensions (i.e., layer 42 may be stretched along its length parallel to dimension X and perpendicular to its thickness in dimension Z). The stretched doped PVA layer will act as a linear polarizer. Tri-acetyl cellulose (TAC) layers 40 and 44 are used to protect PVA layer 42. Conventional polarizers may have TAC layers of about 40 to 80 microns and a PVA layer of about 22 to 28 microns.

The hardness of polymer layers such as PVA layer 42 and TAC layer 44 is typically less than about 3H (on the scale of pencil hardness), making polarizers such as the polarizer of FIG. 4 vulnerable to scratches in display configurations where the polarizer is not covered by a protective cover glass layer. The surface smoothness of conventional polarizers of the type shown in FIG. 4 may also be less than is desirable for optimum display clarity.

Figure 5:
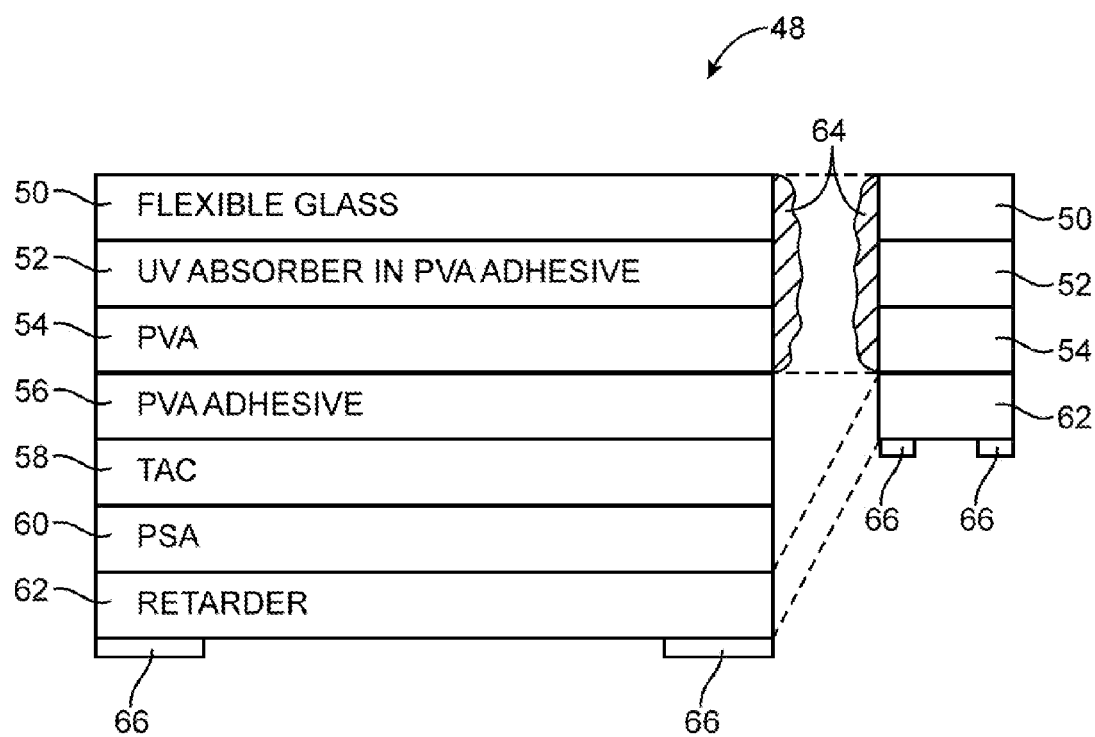
FIG. 5 is a cross-sectional side view of an illustrative polarizer having a flexible layer of glass in accordance with an embodiment of the present invention.

These issues with the conventional polarizer of FIG. 4 may be addressed using a polarizer with a flexible glass layer such as flexible glass layer 50 in display structures 48 of FIG. 5. As shown in FIG. 5, polarizer structures 48 may include an upper layer such as flexible glass layer 50. Glass layer 50 may be formed from a flexible layer of glass such borosilicate glass or soda lime glass (as examples). Glass layer 50 preferably has a hardness of 4H or greater (e.g., 5H or greater, 6H or greater, 7H or greater, or 9H or greater).

Glass layer 50 is preferably able to flex sufficiently to be dispensed from a roll of glass using a roll-to-roll lamination tool. Roll-to-roll lamination tools typically accept rolls of material having cores with diameters of about 6 inches and outer diameters of about 1.3 to 1.5 m. For use with this type of roll, glass layer 50 preferably has a minimum bend radius of about 3 inches (e.g., less than 2 m, less than 1.5 m, less than 1 m, less than 0.5 m, less than 0.1 m, or less than 10 cm). The thickness of glass layer 50 may be about 0.2 mm, less than 0.3 mm, less than 0.2 mm, less than 0.1 mm, less than 0.05 mm, or may have other suitable thicknesses. Glass layer 50 is preferably clear (transparent) so that glass layer 50 may be used over the surface area of display 14.

Polarizer layer 54 may be a stretched layer of PVA or other polymer substrate that is doped with a dopant such as iodine or a linear dye molecule, so that layer 54 allows structures 48 to serve as a linear polarizer. In general, polarizer layer 54 may be formed from any suitable polarizer material. Configurations in which polarizer layer 54 has been formed using PVA material are sometimes described herein as examples. The thickness of PVA layer 54 may be about 22-28 microns.

One or more protective layers such as TAC layer 58 or protective layers formed from other protective materials may be used to protect the lower surface of PVA layer 54 from moisture. The upper surface of PVA layer 54 may be protected from moisture and physical damage (e.g., scratches) by flexible glass layer 50. The thickness of TAC layer 58 may be, for example, about 40-80 microns. TAC layer 58 may be attached to PVA layer 54 using a PVA-based adhesive (e.g., an adhesive formed from PVA and water) or other suitable adhesive. Glass layer 50 may be attached to the upper surface of PVA layer 54 using PVA-based adhesive (e.g., PVA and water) or other suitable adhesive.

A retarder (birefringent layer) such as retarder 62 may be used to provide a display with an enhanced viewing angle and/or may be implemented in the form of a quarter-wave retarder (quarter-wave plate) that is used in conjunction with the linear polarizer formed from PVA layer 54 to form a circular polarizer. Retarder 62 may have a thickness of about 20-60 microns and may be attached to the lower surface of TAC layer 58 using a layer of pressure sensitive adhesive such as PSA layer 60. Pressure sensitive adhesive layer 60 may have a thickness of about 5 to 25 microns. Examples of materials that may be used in forming retarder layers such as retarder 62 are cyclic polyolefin, amorphous polyolefin, linear polyolefin, polycarbonate, polycarbonate copolymer, liquid crystalline polymer, and oligomer coated material.

During use of a display with polarizer structures 48 of FIG. 5 in an environment with exposure to the sun or other sources of ultraviolet (UV) light, there is a potential for sensitive organic layers such as PVA layer 54 and retarder layer 62 to be damaged from exposure to UV light. UV light exposure damage can be avoided by incorporating UV absorbing dopant into glass layer 50. In addition to incorporating UV absorbing dopant into glass layer 50 or instead of incorporating UV absorbing dopant into glass layer 50, a UV absorber such as an additive based on benzotriazole and its derivatives, benzophenon and its derivatives, hindered amine light stabilizers, hydroxyphenyltriazine and its derivatives, or other suitable ultraviolet-light-blocking material may be incorporated into PVA adhesive layer 52. By providing a UV absorber layer of this type between glass layer 50 and PVA layer 54, PVA layer 54 and retarder layer 62 may be protected from UV exposure through the upper surface of polarizer structures 48. The thicknesses of ultraviolet-light-blocking adhesive layer 52 and adhesive layer 56 may each be less than 5 microns, less than 4 microns, or less than 2 microns (as examples).

As shown in FIG. 5, optional protective polymer structures such as protective structures 64 may be formed on the edges of polarizer structures 48 (e.g., on the potentially sensitive edges of flexible glass 50 and one or more additional layers of structures 48). The presence of protective structures 64 may help avoid undesirable damage to glass layer 50 in the event of an impact against the edges of glass 50. Protective structures 64 may be formed from flexible polymers such as polyethylene terephthalate, polycarbonate, polypropylene, or polyethylene (as examples) and/or may be formed from thermoplastic polymers, elastomers, cross-linked ultraviolet-curable resin, cross-linked thermally curable resin, etc. Protective layers 64 may be removed after flexible glass layer 50 has been attached to one or more of the layers of structures 48 or may remain in place after structures 48 have been formed.

To minimize the thickness of polarizer structures 48, layers such as PVA adhesive layer 56, TAC layer 58, and PSA layer 60 may be omitted, as shown in the illustrative configuration of structures 48 that is shown on the right-hand side of FIG. 5. In this configuration, retarder 62 may serve as a lower protective layer for PVA layer 54 (e.g., to protect PVA layer 54 from moisture) and TAC layer 58 need not be used.

It may sometimes be desirable to shield internal device components in device 10 from view by a user from the exterior of device 10. To block interior portions of device 10 under the peripheral border regions of display 14 (i.e., under inactive peripheral regions of display 14), display 14 may, for example, be provided with an opaque masking layer such as opaque masking layer 66. Masking layer 66 may have a shape such as a peripheral rectangular ring that surrounds the periphery of display 14 or other suitable shape. Masking layer 66 may be formed from an opaque masking material such as a layer of black ink, a layer of ink having another color, a layer of opaque plastic (e.g., black plastic), or other opaque material.

Polarizer structures such as polarizer structures 48 of FIG. 5 may be used in implementing one or more linear polarizers and/or circular polarizers in display 14. For example, a polarizer arrangement of the type shown in FIG. 5 may be used in implementing an upper polarizer for a liquid crystal display, may be used in implementing a circular polarizer (e.g., a circular polarizer in a display such as an organic light-emitting-diode display), or other suitable polarizer structures for display 14.

If desired, one or more coating layers may be provided on top of flexible glass 50. Flexible glass layer 50 may have opposing exterior and interior surfaces. The interior surface of glass layer 50 may face the interior of device 10. The exterior surface of glass layer 50 may face the exterior of device 10. As shown in the illustrative configuration for display 14 of FIG. 6, display 14 may have a layer such as coating layer 68 on the exterior surface (outermost surface) of flexible glass layer 50. Polarizer layer 54 may be located adjacent to the opposing interior surface of flexible glass layer 50.

Layer 68 may be an antireflection layer, an anti-smudge layer (e.g., an oleophobic coating such as a fluorine-based layer that resists smudges formed from finger grease), an antistatic coating such as a coating containing antimony oxide ($Sb_2O_5$) particles or other antistatic materials, a scratch-resistant coating, other coating layers, multiple coating layers that perform one or more functions such as these, etc.

Figure 6:
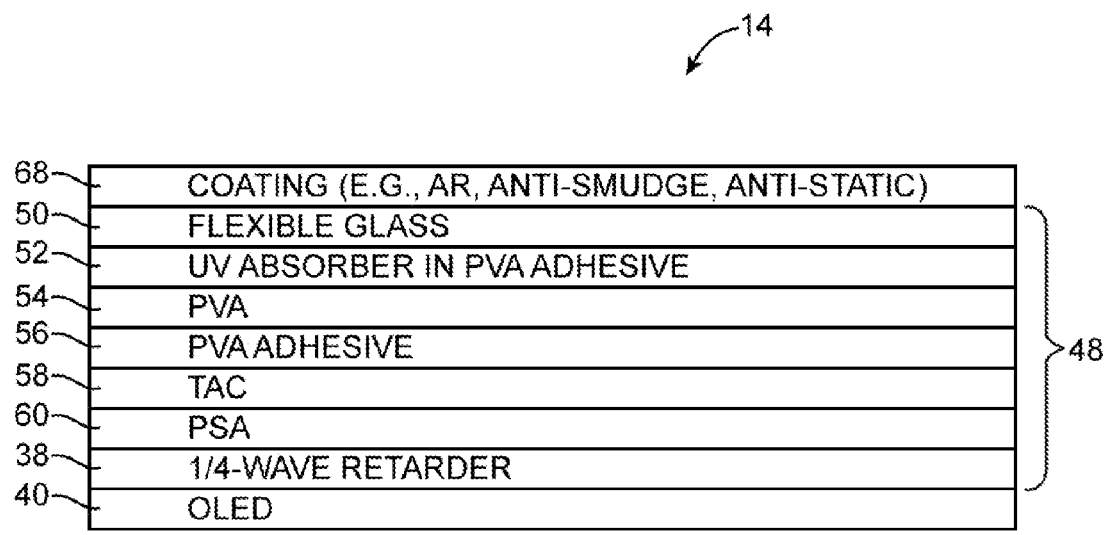
FIG. 6 is a cross-sectional side view of an illustrative organic light-emitting-diode display with a polarizer having a flexible glass layer in accordance with an embodiment of the present invention.

In the FIG. 6 example, polarizer structures 48 have been formed on the surface of organic light-emitting-diode (OLED) display structures 40. This is merely illustrative. Structures 48 with coatings such as coating layer(s) 68 may be formed on any suitable type of display (e.g., a liquid crystal display, etc.).

Figure 7:
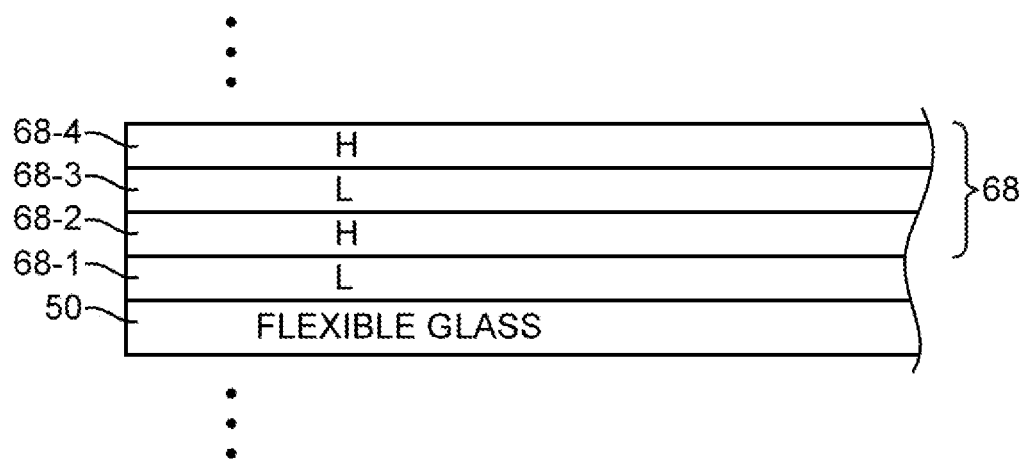
FIG. 7 is a cross-sectional side view of flexible polarizer glass layer having an anti-reflection coating formed from multiple layers of dielectric each having a potentially different index of refraction in accordance with an embodiment of the present invention.

As shown in FIG. 7, coating 68 on polarizer flexible glass layer 50 may be formed from multiple sublayers (e.g., two or more coating layers such as coating layers 68-1, 68-2, 68-3, 68-4, . . . ). The individual layers in coating 68 may, as an example, have alternating high and low indices of refraction for implementing an antireflection coating. In general, the sublayers of coating 68 may have any suitable pattern (e.g., alternating high and low indices or refractions, patterns involving three or more or four or more different indices of refraction, etc.) and may be used to implement wavelength filters, antireflection coatings, or other optical coating layers. Dielectric films for implementing the sublayers of coating 68 may be formed from organic materials, inorganic materials (e.g., metal oxide, silicon oxide, etc.), or combinations of organic and inorganic materials.

Figure 8:
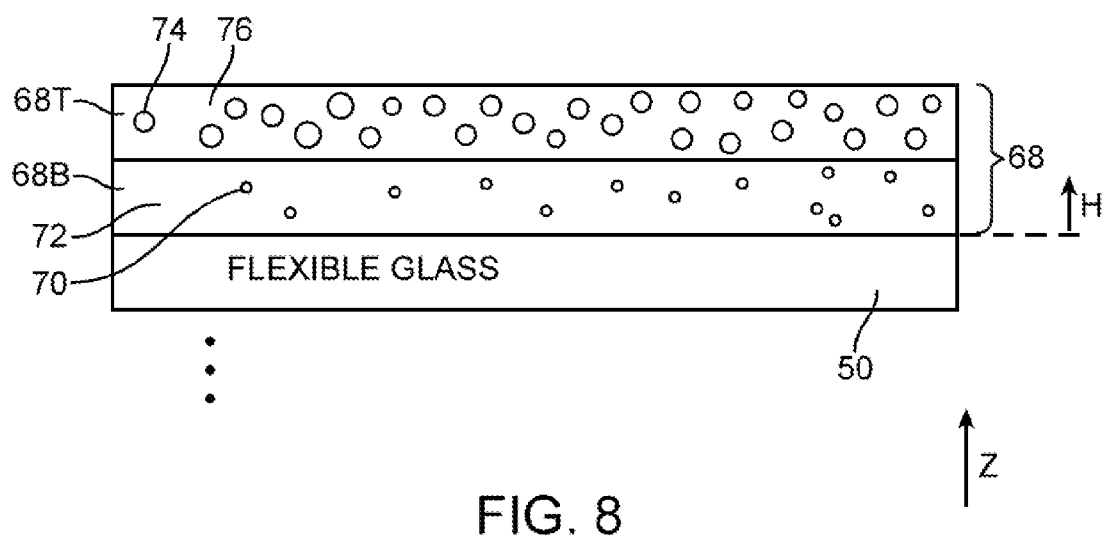
FIG. 8 is a cross-sectional side view of a flexible glass polarizer layer with coating layers forming a graded index of refraction coating in accordance with an embodiment of the present invention.

FIG. 8 is a cross-sectional side view of a coating layer on flexible glass layer 50 that contains two sublayers 68B and 68T. Coating layers 68B and 68T may contain nanoparticles or voids to adjust their properties (e.g., antistatic properties, index or refraction, etc). For example, layer 68B may be formed from material 72 and may contain nanoparticles or voids 72. Layer 68T may be formed from material 76 and may contain nanoparticles or voids 74. Particles or voids such as particles/voids 72 and/or 74 may be nanoparticles of antimony oxide ($Sb_2O_5$) for forming an antistatic coating, particles formed from metal oxides or other transparent particles, voids formed within the sublayer materials, etc. Antimony oxide particles and other particles and/or voids in layers 68B and/or 68T may have diameters of about 100 nm (as an example) and may have a higher index of refraction than material 72 and material 76. Materials such as materials 72 and 76 may be, as an example, organic binder materials that can be filled with a desired concentration of particles or voids such as particles or voids 70 and 74. The sizes and concentrations of particles or voids such as particles or voids 70 and 74 may be varied to grade the index or refraction of one or more layers such as layer 68B and layer 68T.

Graded index of refraction coatings may be used in forming antireflection coatings (as an example). In the illustrative configuration of FIG. 8, coating 68 is shown as containing two or more coatings such as coatings 68B and 68T. In general, there may be one coating such as coating 68B (i.e., without coating 68T), two or more than two coatings such as coatings 68B and 68T, etc. If desired, the index of each sublayer (e.g., sublayer 68B) in coating 68 may be graded by changing the concentration and/or size of the nanoparticles of material and/or voids that are included in each sublayer as a function of vertical dimension Z. For example, the concentration and/or size and other properties of particles 70 may be varied continuously as a function of height H above the interface between layer 68B and flexible glass layer 50. Voids may be filled with vacuum, air, etc. Low-density particles (e.g., hollow spheres, etc. may also be incorporated into coatings in fixed and/or varying concentrations to adjust the optical properties of one or more sublayers in coating 68, if desired.

Figure 9:
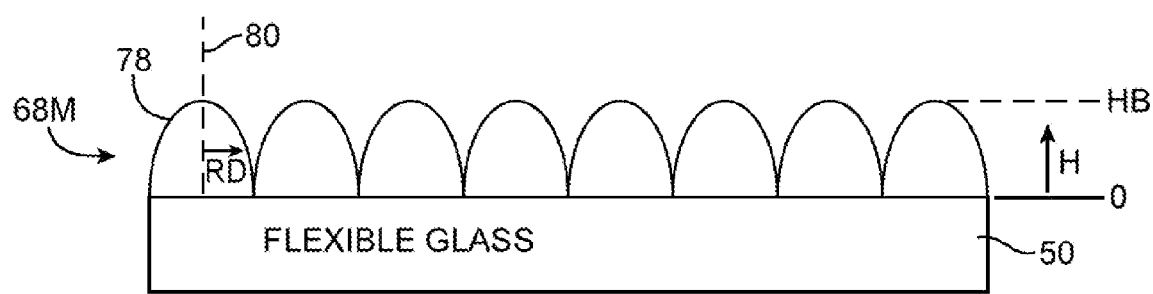
FIG. 9 is a cross-sectional side view of a moth's eye coating of the type that may be used on a flexible glass layer in a polarizer in accordance with an embodiment of the present invention.

FIG. 9 is a cross-sectional side view showing how flexible glass layer 50 may be coated with a moth's eye structure to produce a graded index of refraction coating. Moth's eye coating 68M may exhibit an index of refraction that decreases as a function of vertical height H above the interface between moth's eye coating layer 68M and flexible glass layer 50. Moth's eye coating 68M may have an array of bumps such as bumps 78. Each bump may have a rotationally symmetric shape or other vertically elongated shape. For example, bump 78 may have a shape that is symmetrical with respect to rotation about longitudinal axis 80. Axis 80 may be parallel to vertical axis Z. Each bump may be tapered. For example, the radius of bump 78 (i.e., the distance RD from central longitudinal axis 80 to the surface of each bump 78) may decrease as a function of height H (i.e., RD may have a maximum value at H=0 and may have a minimum value of 0 when the value of height H is equal to the height HB of bump 78). Graded index coatings such as the illustrative moth's eye coating of FIG. 9 or a graded index coating formed by incorporating varying amounts of particles (voids, nanoparticles of oxide, etc.) may be used in forming antireflection coatings and other coatings for display 14.

Figure 10:
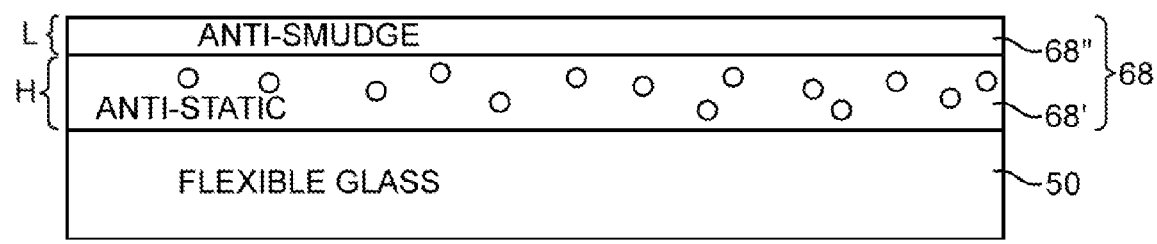
FIG. 10 is a cross-sectional side view of an illustrative polarizer with a flexible glass layer having antistatic and anti-smudge layers that are configured to serve as an antireflection coating in accordance with an embodiment of the present invention.

In the example of FIG. 10, coating 68 has a lower sublayer such as sublayer 68' and an upper sublayer such as sublayer 68". Sublayer 68' may be formed from a layer of material that contains antimony oxide particles to serve as an antistatic layer (as an example). Sublayer 68" may be a fluorine-based layer that serves as an anti-smudge layer (as an example). The indices of reflection of layers 68' and 68" may be configured to form an antireflection coating (i.e., the index of refraction of layer 68" may be lower than the index of refraction of layer 68', as an example).

A system of the type shown in FIG. 11 may be used to characterize the smoothness of display 14. For example, the system of FIG. 11 may be used in measuring a reflection image clarity value according to Japanese Industrial Standard (JIS) No. 7374. Light source 82 may emit light 84. Lens 86 may focus light 84 through comb filter 88. Light 84 that has passed through comb filter 88 may reflect from exposed upper surface 94 of structures 96. Structures 96 may be, for example, a sample that includes polarizer structures 48 (e.g., polarizer structures 48 that are formed using flexible glass layer 50 and that may be optionally coated with a coating layer such as an antireflection layer, antistatic layer, anti-smudge layer, etc.).

Light 84 may strike surface 94 at an angle of incidence A with respect to surface normal 90. The value of angle A during the evaluation of structures 96 may be, for example, 60°, as shown in FIG. 11. Reflected light 84 from surface 94 may be detected using detector 92.

FIG. 12 is a graph showing how the transmittance T of comb filter 88 may vary as a function of lateral dimension LD across the surface of comb filter 88. The opaque line size P of transmittance T of comb filter 88 may be 0.125 mm, 0.25 mm, 0.5 mm, and 1 mm for four corresponding comb filters (as examples). The intensity I of measured reflected light 84 at detector 92 may vary between a maximum value Imax and a minimum value Imin, as a function of lateral dimension LD across the surface of detector 92, as shown in FIG. 13. The maximum value Imax may be associated with clear portions of comb filter 88 (i.e., portions with a 100% transmittance) and the minimum value of Imin may be associated with opaque portions of comb filter 88 (i.e., portions with a 0% transmittance).

The value of reflection image clarity Ci for a comb filter of line spacing i is equal to 100%*(Imax−Imin)/(100-0). The value for reflection image clarity C per JIS 7374 is given by the equation of FIG. 14 (i.e., C is equal to the sum of Ci for comb filter sizes i=0.125 mm, i=0.25 mm, i=0.5 mm, and i=1 mm). Conventional displays are typically characterized by values of reflection image clarity C of about 370%. Using flexible glass layer 50 in place of conventional arrangements such as TAC layer 44 of FIG. 4, polarizer structures 48 (with or without coating layer 68) is expected to be capable of achieving reflection image clarity values (values of C) of greater than 370% (i.e., greater than 375%, greater than 380%, greater than 390%, etc.). The theoretical maximum possible value for C is 400%, so values of 390% or other values between 370% and 400% may represent good reflection image clarity values for use in a display.

Figure 15:
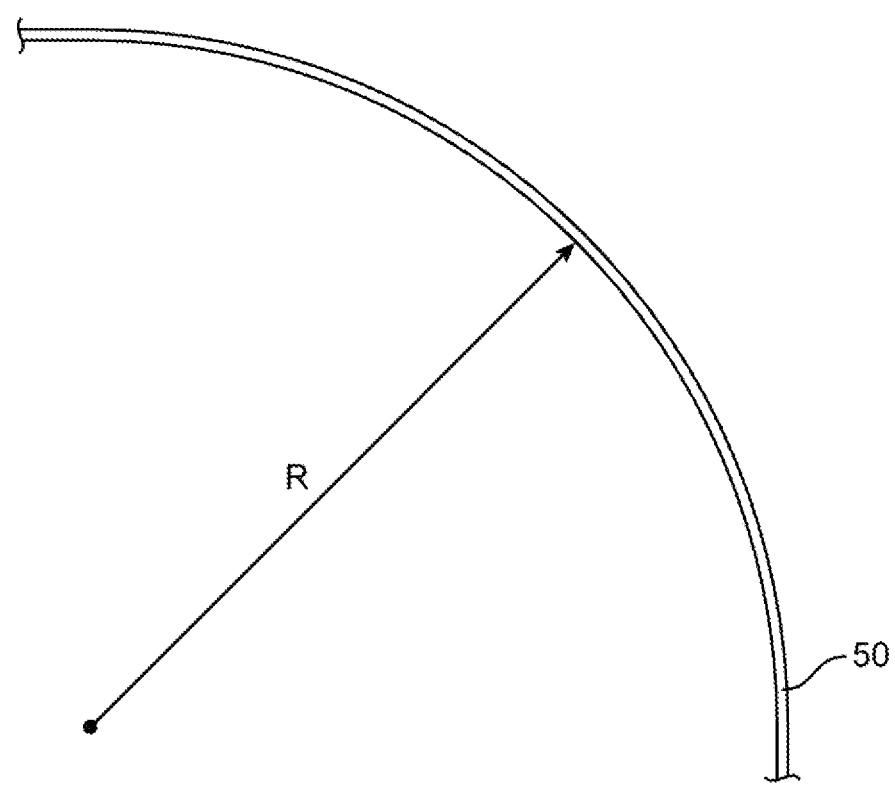
FIG. 15 is a side view of an illustrative portion of a flexible glass layer for a polarizer showing how the glass layer may have a portion characterized by a minimum bend radius in accordance with an embodiment of the present invention.

To accommodate roll-to-roll manufacturing techniques, it may be desirable for the minimum bend radius R of flexible glass layer 50 to be sufficiently small. FIG. 15 shows how minimum bend radius R is measured. If a flexible layer such as layer 50 is bent to a bend radius smaller than its minimum bend radius, the flexible layer will experience excessive bending stress and will break. To be conveyed on commonly accepted roll cores of 6 inch diameter, it may be desirable for the minimum bend radius R of flexible glass layer 50 to exhibit a value of 3 inches or less. Rolls of flexible glass layer 50 with larger cores (e.g., cores of 0.2 m, 0.4 m, 0.5 m, 1 m, etc.) may also be used during manufacturing, but rolls with cores of these sizes will generally not be able to carry as much material for a given maximum diameter as rolls with smaller cores (e.g., 6 inch cores). Illustrative values that may be used for the minimum bend radius R of flexible glass layer 50 include 3 inches or less, 2 m or less, 1.5 m or less, 1 m or less, 0.5 m or less, 0.1 m or less, and 10 cm or less.

Figure 16:
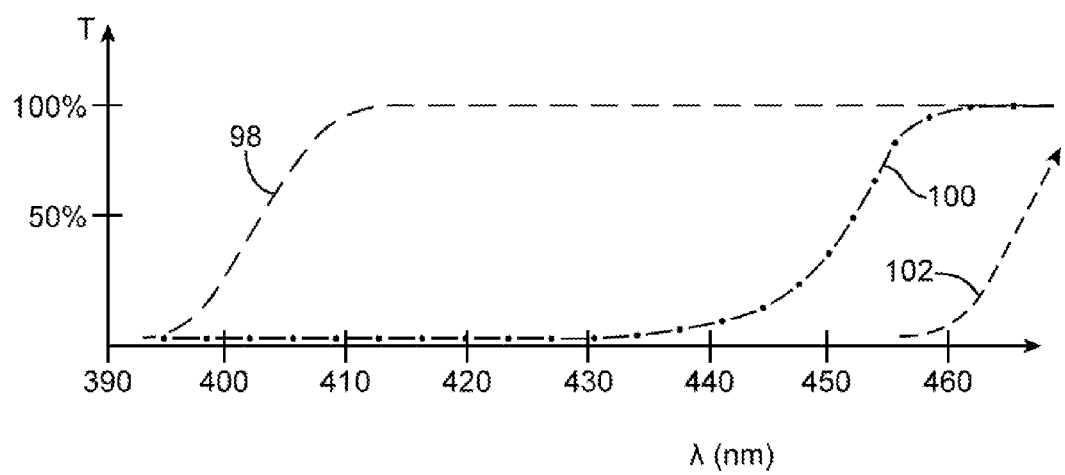
FIG. 16 is a graph showing how the transmittance of an ultraviolet light filter structure for a polarizer may perform in accordance with an embodiment of the present invention.

In configurations for flexible glass 50 in which flexible glass 50 is doped with a UV absorbing material, it may be desirable to incorporate sufficient UV absorbing material to cut UV light transmittance enough to preserve underlying layers such as PVA layer 54 from UV light exposure damage. For example, it may be desirable to incorporate sufficient UV absorbing material to ensure that the UV-light-blocking capabilities of glass layer 50 (alone or in conjunction with an optional UV absorber layer such as layer 52 of FIG. 5) exhibit a transmittance curve equal to or less than curve 100 of FIG. 16 at UV wavelengths of about 390-400 nm and shorter. Additional UV blocking can be achieved by incorporating more UV blocking material into glass 50 and/or absorber layer 52. For example, sufficient additional UV blocking material may be used to achieve a reduced UV transmittance curve such as curve 100 of FIG. 16. Excessive UV blocking material (e.g., to produce curves such as curve 102 that exceed the blocking capabilities of curve 100 may not be desirable, because they may produce visible artifacts (e.g., yellowing) in display 14.

Figure 17:
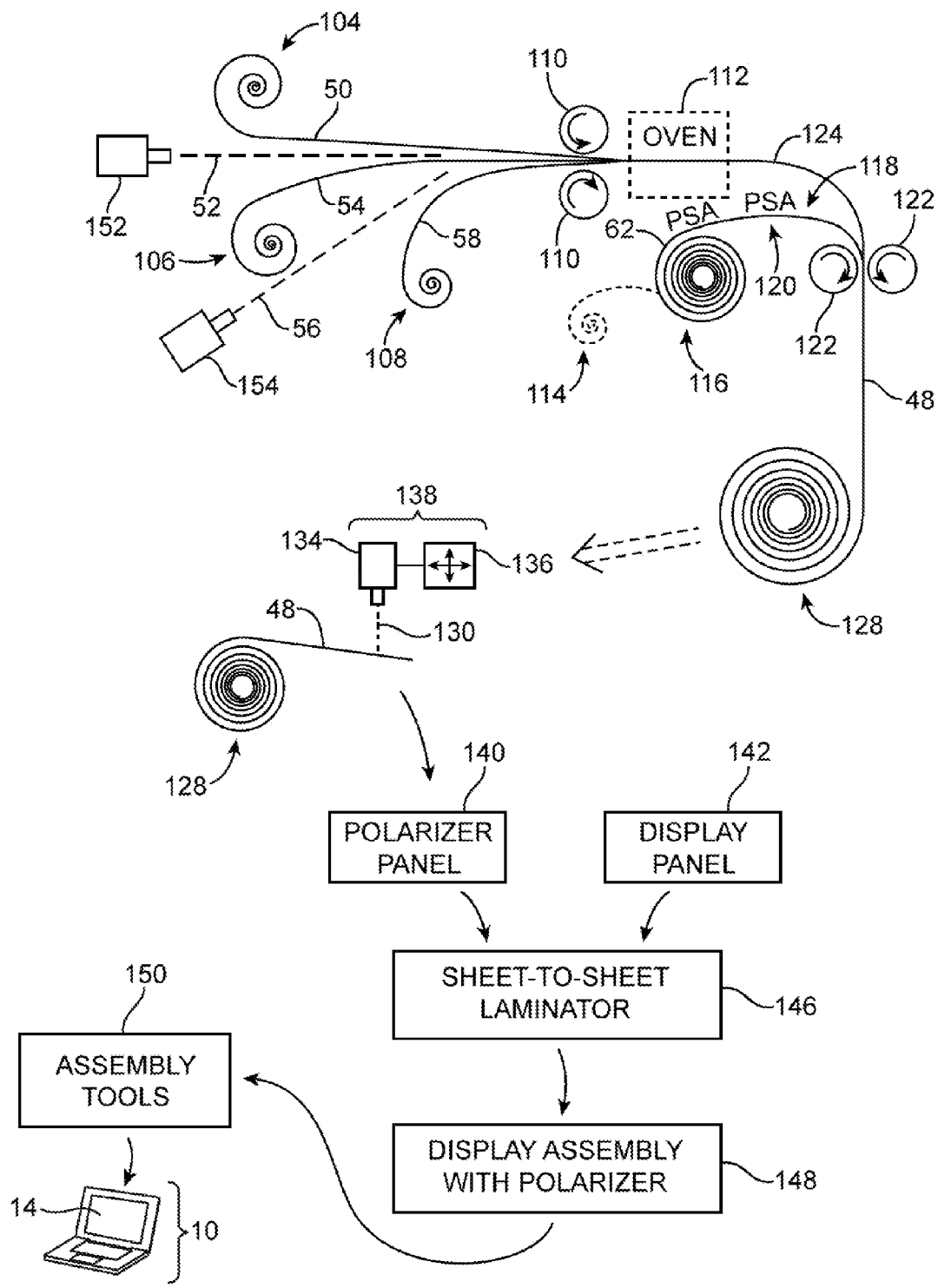
FIG. 17 is a diagram of a system that may be used in forming electronic devices and displays with polarizers having flexible glass layers in accordance with an embodiment of the present invention.

FIG. 17 shows how a device such as device 10 of FIG. 1 with a display such as display 14 may be provided with a polarizer that includes a flexible glass layer such as flexible glass layer 50.

The system of FIG. 17 may use roll-to-roll and sheet-to-sheet lamination processes to form polarizer structures 48 and display 14. As shown in FIG. 17, flexible glass 50 may be provided in the form of a roll of flexible glass such as flexible glass roll 104. The edges of glass 50 in roll 104 may be cut using a laser to help prevent cracks or other localized stress points along the edges of glass layer 50. The reduction of localized stress points along the edge of glass layer 50 may help minimize or eliminate undesired localized weakness in the edges of glass layer 50 that might otherwise serve as potential initiation points for glass breakage. PVA layer 54 may be provided in a roll of PVA sheet material such PVA roll 106. TAC layer 58 may be dispensed from a roll of TAC sheet material such as roll 108.

Adhesive dispenser 152 may dispense adhesive 52 such as PVA adhesive with a UV absorber between glass sheet 50 and PVA sheet 54. Adhesive dispenser 154 may dispense adhesive 56 (e.g., PVA adhesive or ultraviolet-light-cured adhesive such as UV-curable resin) between PVA sheet 54 and TAC sheet 58. In a continuous process, sheets 50, 54, and 58 may be dispensed from rolls 104, 106, and 108 and compressed (laminated) together using rollers such as rollers 110 or other roll-to-roll lamination equipment to form a sheet of materials such as sheet 124. The roll-to-roll lamination process may then continue by passing sheet 124 through an adhesive curing tool such as oven 112 or other heat source. The heat from oven 112 may cure the adhesive between the layers of material and may help eliminate water from PVA layer 52. In configurations in which the adhesive between the layers of material is a UV-curable resin, adhesive curing tool 112 may include an ultraviolet light source such as a UV lamp to produce UV light that promotes cross-linking in the UV-curable resin and thereby cures the resin.

Following curing, material 124 (i.e., a sheet of polarizer that includes a flexible glass upper layer, PVA layer, and lower TAC layer), may be laminated with additional optical films such as retarder layer 62. Retarder sheet material 62 may be dispensed from a roll of retarder sheet such as roll 116. Roll 116 may include a peelable backing layer that covers a pressure sensitive adhesive (PSA) layer. During the process of dispensing retarder layer 62 from roll 116, backing layer 114 may be removed from layer 62 and discarded. After exiting roll 116, layer 62 will have one surface that is covered with PSA (surface 118) and an opposing surface such as surface 120 that is generally not covered with PSA.

Rollers such as rollers 122 or other roll-to-roll lamination equipment may perform a roll-to-roll lamination operation that attaches layer 62 to the underside of layer 124 using the exposed PSA, thereby producing finished polarizer structures 48. If desired, roll 108 may be used to dispense retarder 62 instead of TAC (e.g., to produce a stack-up for structures 48 of the type shown on the right-hand side of FIG. 5).

If desired, the roll-to-roll lamination operations may be performed in one or more individual steps, rather than continuously as shown in FIG. 17. For example, following a first roll-to-roll lamination operation to produce material 124, material 124 may be collected onto a roll at one manufacturing facility. Later, at the same facility or at another manufacturing facility, that roll of material 124 may be laminated with the material from roll 116 (e.g., retarder film or other optical films) to form material 48 in a subsequent roll-to-roll lamination operation.

Finished polarizer roll 128 may be shipped to a different manufacturing location (if desired). Laser cutting tools 138 may then be used to cut sheet material 48 from roll 128 into polarizer panels. Laser cutting tools may include a laser such as laser 134 that emits a laser beam such as laser beam 130. Laser 134 may be, for example, a $CO_2$ laser that emits infrared light. Laser 134 may be a continuous wave (CW) laser such as a CW carbon dioxide laser. The use of a CW cutting laser instead of a pulsed laser may help reduce the amount of thermal damage that is produced along the cut edge of the glass. The position of laser 134 and beam 130 may be controlled using computer-controlled positioner 136. After cutting polarizer sheet material 48 into rectangular sheets (panels 140), remaining portions of display 14 such as display panels 142 may be laminated to polarizer panels 140 using sheet-to-sheet laminator 146. Sheet-to-sheet laminator may include a roller or equipment that can laminate flexible polarizer panel 140 to display panel 142 without introducing bubbles between panel 140 and panel 142. Panel 142 may be an organic light-emitting-diode panel, a liquid crystal display panel (containing, for example, a color filter layer, liquid crystal material, thin-film transistor layer, and lower polarizer, etc.), or other suitable display structures.

The display panel to which the layer of polarizer has been laminated (shown as display assembly with polarizer 148 in FIG. 17) may then be further processed using assembly tool 150 and assembled into a finished product such as a finished display 14 and device 10.

Figure 18:
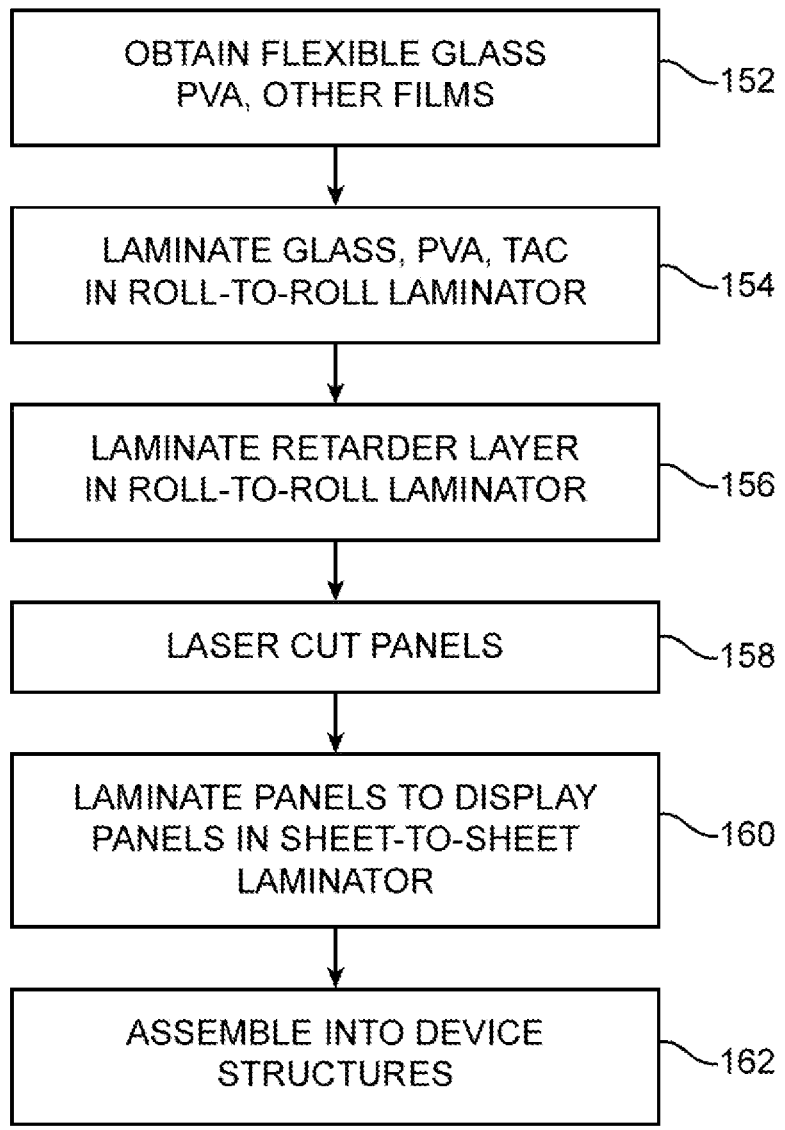
FIG. 18 is a flow chart of illustrative steps involved in forming devices and displays with polarizers having flexible glass layers in accordance with an embodiment of the present invention.
Figure 19:
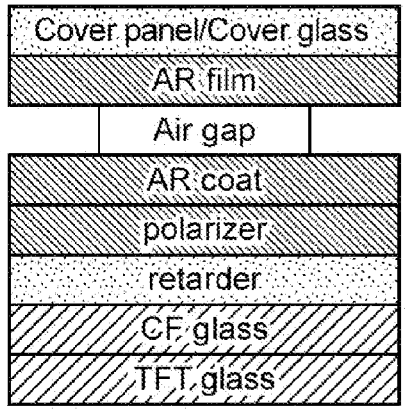
FIGS. 19, 20, 21, and 22 are cross-sectional side views of conventional electronic devices.

FIG. 18 is a flow chart of illustrative steps involved in forming devices and displays with polarizers such as polarizers having flexible glass layers.

At step 152, a roll of having flexible glass 50 and other rolls of material such as PVA roll 106, TAC roll 108, and retarder roll 116 may be installed in roll-to-roll lamination equipment of the type shown in FIG. 17. At step 154, the roll-to-roll lamination equipment (e.g., rollers 110) may be used to form a laminated roll of material such as material 124 that includes flexible glass layer 50, PVA layer 54, and TAC layer 58. During the operations of step 156, roll-to-roll lamination equipment (e.g., rollers 122) may be used to laminate retarder layer 62 to layer 124, thereby forming a roll of polarizer structures 48 such as roll 128.

At step 158, laser cutting tool 138 may be used to cut polarizer 48 into desired panel shapes such as rectangles (e.g., rectangular panels 140 for use in rectangular displays). After forming polarizer panels 140 during the operations of step 158, a sheet-to-sheet lamination tool such as sheet-to-sheet laminator equipment 146 of FIG. 17 may be used to laminate polarizer panels 140 to display structures 142 (step 160). For example, polarizer panels 140 may be laminated to liquid crystal display structures such as a liquid crystal display assembly that include a color filter layer and thin-film transistor layer or may be laminated to an organic light-emitting-diode display layer. The resulting display structures may be used in creating a finished display module and may be assembled into device 10 as display 14 using assembly tools 150 (step 162).

FIGS. 19, 20, 21, and 22 are cross-sectional side views of conventional electronic display arrangements. The arrangement of FIG. 19 has been used in a computer. The arrangement of FIG. 20 has been used in a portable computer. The arrangement of FIG. 21 has been used in a tablet computer. The arrangement of FIG. 22 has been used in a cellular telephone.

In the arrangements of FIGS. 19, 20, 21, and 22, relatively thick cover glass layers (e.g., cover glass layers of about 0.5 mm or more in thickness) have been used to form outer protective display layers. To avoid air bubbles, an air gap is typically used to separate the lower surface of the cover glass from underlying display layers (see, e.g., the arrangements of FIGS. 19, 20, and 21). The surfaces of material adjacent to the air gap can give rise to undesired reflections. These surfaces may therefore be covered with antireflection layers (see, e.g., the AR film layers and an AR coat layers of FIGS. 19, 20, and 21).

Figure 21:
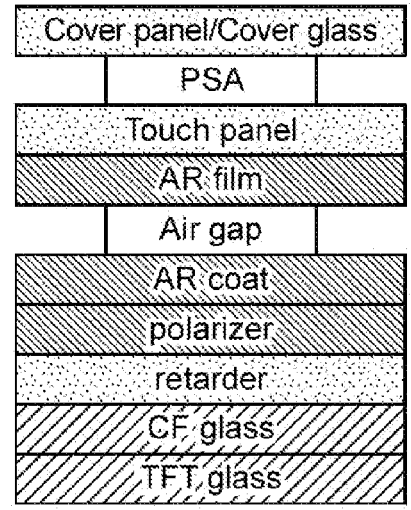
Figure 20:
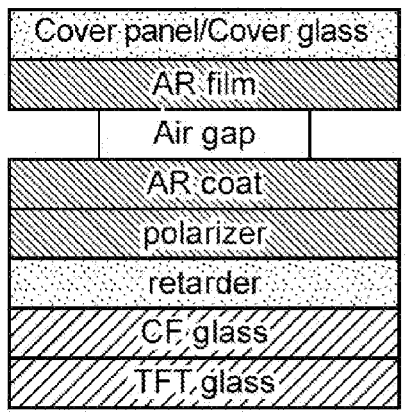
Figure 22:
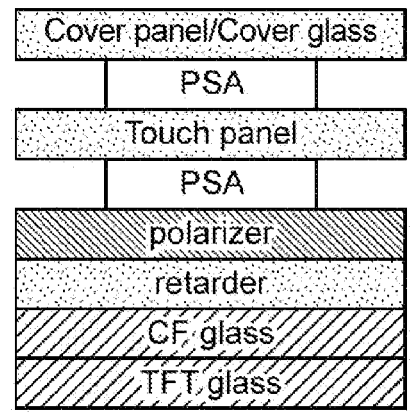

In some configurations, a touch sensor layer (e.g., a touch sensor substrate coated with patterned indium tin oxide capacitor electrodes such as the layer labeled "touch panel" in FIGS. 21 and 22 may be incorporated into the display. Polarizer layers ("polarizer") and birefringent layers ("retarder") and layers of adhesive (PSA) may also be included in the displays. These layers may be formed on top of liquid crystal display structures such as a color filter layer ("CF glass") and thin-film transistor layer ("TFT glass") to form a finished display module.

In configurations of the type shown in FIG. 22, no air gaps are present. This type of configuration can be difficult to manufacture in larger panel sizes. The configuration of FIGS. 19, 20 and 21 include air gaps, which can facilitate bubble-free assembly, but can add undesired expense and complexity, due to the use of antireflection layers to reduce excessive reflections at the air gap interfaces.

Figure 23:
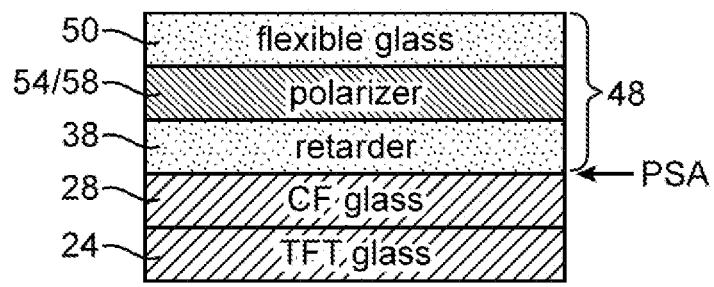
FIGS. 23 and 24 are cross-sectional side views of illustrative configurations for electronic devices having polarizers with flexible glass layers in accordance with an embodiment of the present invention.
Figure 24:
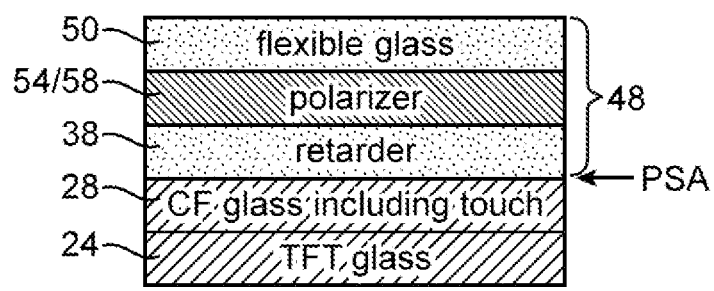

Illustrative display configurations of the type that may be formed using flexible glass layer 50 are shown in FIGS. 23 and 24. As shown in FIG. 23, air gaps and associated internal antireflection layers may be avoided in configurations in which polarizer structures 48 are laminated to display structures 28 and 24 using pressure sensitive adhesive (PSA). During lamination (e.g., in sheet-to-sheet lamination equipment), air bubbles may be avoided, by flexing structures 48 during the process of attaching structures 48 to the upper surface of color filter glass 28. Polarizer layer 54/58 may be formed from a layer of PVA and an underlying layer of TAC as shown on the left-hand side of FIG. 5 or may be formed from a layer of PVA without TAC as shown by layer 54 on the right hand side of FIG. 5. Polarizer structures 48 may, if desired, be laminated to other types of display structures (e.g., organic light-emitting-diode structures). The example of FIG. 23 is merely illustrative.

Touch sensor arrays may be incorporated into a display that has a flexible glass polarizer to provide the display with touch sensing capabilities. As shown in the illustrative configuration of FIG. 24, for example, color filter glass layer 28 may be provided with an integral layer of touch sensor capacitor electrodes (e.g., one or more patterned indium tin oxide layers). If desired, touch sensor arrays may be implemented using separate substrates (e.g., flex circuit substrates formed from sheets of polyimide or other flexible polymers, substrates formed from rigid printed circuits boards, rigid substrates of plastic, glass, ceramic, etc.). The configuration of FIG. 24 in which touch sensing structures have been integrated into one of the layers of the display such as a liquid crystal display color filter glass layer is merely illustrative. If desired, an array of capacitive touch sensor electrodes may be integrated into displays of other types (e.g., organic light-emitting-diode displays, etc.). Touch sensors may also be formed using other touch technologies (e.g., resistive touch, acoustic touch, pressure-sensitive touch based on piezoelectric force sensors or other force sensors, etc.).

If desired, coating layers such as coating 68 may be incorporated onto the exterior surface or one or more interior surfaces of the layers of displays of the type shown in FIGS. 23 and 24. These coating layers may include antistatic layers, antireflection coatings formed from materials with alternating indices of refraction, coating layers with graded indices of refraction such as coating layers with graded concentrations of nanoparticles or voids or layers with moth's eye structures, anti-smudge layers, layers that perform additional functions or collections of two or more of these functions, etc.

The layers that are used to form the displays may be laminated using roll-to-roll lamination equipment, sheet-to-sheet lamination equipment, or other lamination tools. Layers may be laminated to each other using pressure sensitive adhesive, thermally curable resin, or other suitable adhesives. The adhesive (glue) that is used to laminate the layers together may be formed from materials that have chemical affinities to one or more different types of material. For example, the adhesive may include organic materials that have chemical affinities for both glass and PVA (as an example).

Flexible glass 50 may have a thickness of between 1 to 300 microns, from 30 to 200 microns, from 50 to 150 microns, or other suitable glass thickness. Flexible glass thicknesses of this order will tend to be sufficiently thin to achieve desired minimum bend radiuses without exhibiting excessively low mechanical strengths. Borosilicate glass, soda lime glass, chemically strengthened glass, or glasses of other compositions may be used in implementing flexible glass 50.

The edge of the flexible glass may be configured to resist breaking. For example, the edge of the flexible glass may be covered with flexible polymers such as polyethylene terephthalate, polycarbonate, polypropylene, or polyethylene, other thermoplastic films, protective layers of thermoplastic polymers, elastomers, cross-linked UV-curable resin, or cross-linked thermal curable resin (as examples). The protective edge covering for the flexible glass may be removed from the glass after laminating the flexible glass to the PVA layer to form polarizer structures 48 or may be left in place following lamination to form polarizer structures 48.

The edge of the flexible glass that runs parallel to the length of the sheet of glass in the glass roll may be cut using a method such as laser cutting (e.g., using a carbon dioxide laser) that resists the formation of micro-cracks that could generate defects at the edge of the flexible glass. The flexible glass may also be cut into panels using laser cutting.

The use of the UV absorber layer 52 and/or UV absorbing material in flexible glass layer 50 may protect PVA (polarizer) layer 54 and other organic layers below flexible glass layer 50 from UV damage. The UV absorbing structures may be configured so that the transmittance of flexible glass 50 and UV absorber layer 52 is 50% or less at 450 nm and shorter UV wavelengths, is 50% or less at 420 nm and shorter UV wavelengths, is 50% or less at 400 nm and shorter UV wavelengths, or has other suitable transmittance characteristics. As described in connection with FIG. 16, these transmittance characteristics may prevent UV damage to the PVA, the iodine dopant in the PVA layer, and the organic materials in the retarder while allowing display 14 to exhibit satisfactory visible light performance when displaying images for a user of device 10 (i.e., while ensuring that excessive blue light is not absorbed which might cause display 14 to appear yellowish).

Coating 68 may include one or more layers that serve as an antireflection coating, an anti-smudge coating, an antistatic coating, other suitable coatings, or combinations of two or more or three or more of these coatings. For example, antireflection surfaces for display 14 may be formed using porous material (e.g., porous silicon dioxide) with graded refractive index distributions (i.e., a refractive index that varies as a function of height through the thickness of a layer), patterned solid material such as a moth's eye structure that exhibits a graded refractive index distribution due to a height-dependent variation in the amount of air within the material, graded index material formed using nanoparticles or voids, one or more inorganic material layers with different indices of refraction, or one or more organic material layers with different indices of refraction. Anti-smudge coating layers may be formed on the outermost surface of display 14 to help resist fingerprint smudges (e.g., smudges that might otherwise arise when using display 14 as a touch screen). Anti-smudge coating layers may be formed from materials that exhibit low surface tension such as hydrofluorocarbon materials, polysiloxane, etc.

An antistatic layer may be incorporated into any suitable layer within a polarizer. For example, an antistatic layer may be incorporated into an uppermost surface coating, may be incorporated into a second-to-uppermost surface coating, may be incorporated into flexible glass layer 50, may be incorporated into PVA layer 54, may be incorporated into retarder 62, or may be incorporated into other layers in display 14 or polarizer structures 48 (e.g., into a PSA layer used to laminate layers of polarizer structures 48 together).

The polarizer structures may include a retarder film such as retarder 62 of FIG. 5. The retardation exhibited by the retarder may be more than 30 nm and less than 500 nm (as an example). The Nz value of the retarder may be more than −5 and less than 5. The retarder may exhibit positive or negative dispersion between 450 nm and 550 nm. For example, the wavelength dispersion defined by R(450 nm)/R(550 nm) may have a magnitude between 0.7 and 1.3, between 0.8 and 1.2, or other suitable values, where R(450 nm) represents the retardation value of the retarder at 450 nm and where R(550 nm) represents the retardation value of the retarder at 550 nm.

The foregoing is merely illustrative of the principles of this invention and various modifications can be made by those skilled in the art without departing from the scope and spirit of the invention.

What is claimed is:

1. A display comprising:
   a flexible glass layer;
   at least one additional layer, wherein the at least one additional layer comprises a birefringent layer; and
   a polarizer layer interposed between the flexible glass layer and the at least one additional layer.

2. The display defined in claim 1 wherein the flexible glass layer has a minimum bend radius of less than 1 m.

3. The display defined in claim 1 wherein the polarizer layer comprises a layer of polyvinyl alcohol.

4. The display defined in claim 1 wherein the at least one additional layer comprises a layer of tri-acetyl cellulose.

5. The display defined in claim 1 wherein the flexible glass layer comprises ultraviolet-light-blocking materials.

6. The display defined in claim 1 further comprising an ultraviolet-light-blocking layer between the flexible glass layer and the polarizer layer.

7. The display defined in claim 6 wherein the ultraviolet-light-blocking layer comprises an adhesive containing an ultraviolet-light-blocking material.

8. The display defined in claim 1 wherein the flexible glass layer comprises opposing exterior and interior surfaces, the display further comprising a coating on the exterior surface of the flexible glass layer, wherein the polarizer layer is located adjacent to the interior surface.

9. The display defined in claim 8 wherein the coating comprises at least one layer selected from the group consisting of: an antireflection layer, an antistatic layer, an anti-smudge layer.

10. The display defined in claim 8 wherein the coating comprises at least one layer with a graded index of refraction.

11. The display defined in claim 1 further comprising a liquid crystal display color filter layer and a thin-film transistor layer that are mounted under the additional layer.

12. The display defined in claim 1 further comprising an organic light-emitting-diode layer mounted under the additional layer.

13. The display defined in claim 1 further comprising a touch sensor array.

14. A display, comprising:
   a flexible layer with a hardness of at least 5H and a minimum bend radius of less than 1 m;
   an additional layer; and
   a polyvinyl alcohol layer doped with iodine that is configured to polarize light and that is interposed between the flexible layer and the additional layer.

15. The display defined in claim 14 wherein the flexible layer comprises a flexible glass layer and wherein the additional layer comprises a layer of tri-acetyl cellulose.

16. The display defined in claim 14 wherein the flexible layer comprises a flexible glass layer and wherein the additional layer comprises a birefringent layer.

17. A display, comprising:
   a glass layer;
   an additional layer; and
   a polarizer layer that is interposed between the glass layer and the additional layer; and
   an ultraviolet-light-blocking layer between the glass layer and the polarizer layer.

18. The display defined in claim 17 wherein the glass layer has a thickness of less than 0.2 mm.

19. The display defined in claim 18 wherein the additional layer comprises a layer of tri-acetyl cellulose.

20. The display defined in claim 18 wherein the additional layer comprises a birefringent layer.

* * * * *